United States Patent Office 2,857,415
Patented Oct. 21, 1958

2,857,415

ORGANIC PHOSPHORUS COMPOUNDS

Gail H. Birum, Dayton, Ohio, assignor to Monsanto Chemical Company, St. Louis, Mo., a corporation of Delaware No Drawing. Application February 15, 1956
Serial No. 565,527

4 Claims. (Cl. 260—461)

The present invention relates to organic phosphorus compounds and deals more particularly with esters of certain sulfur-containing phosphonic acids, to methods of producing the same, to insecticidal compositions comprising the new esters and to methods of destroying insect pests in which said compositions are used.

According to the invention there are prepared new and valuable compounds by condensation of one mole of perchloromethyl mercaptan with four moles of a phosphite having the formula $$(RO)_2POR'$$

in which R is selected from the class consisting of alkyl and haloalkyl radicals of from 1 to 6 carbon atoms and R' is selected from the class consisting of R and alkali metal.

The present condensates are esters of phosphorothiomethylidynetriphosphonic acid and have the formula

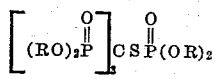

in which R is as herein defined.

As examples of phosphites which condense with perchloromethyl mercaptan according to the invention to give the present phosphorothiomethylidynetriphosphonates may be mentioned the trialkyl phosphites such as trimethyl, triethyl, triisopropyl, tributyl, tri-n-amyl, tri-tert-amyl and trihexyl phosphite; the haloalkyl phosphites such as tris(2-chloroethyl), tris(2-bromoethyl), tris-(3-chloropropyl), tris(2-iodopropyl), tris(4-chlorobutyl), tris-(2-bromobutyl), tris(5-chloroamyl) and tris(6-bromohexyl) phosphites; the alkali metal dialkyl or bis(haloalkyl) phosphites such as sodium dimethyl phosphite, sodium diethyl phosphite, potassium di-n-propyl phosphite, potassium bis-2-chloroethyl phosphite, lithium di-tert-amyl phosphite and sodium dihexyl phosphite. The mixed phosphites are also useful. Thus there may be used esters having two or even three different alkyl groups or esters containing both alkyl and haloalkyl groups, e. g., dimethyl ethyl phosphite, amyl dibutyl phosphite, sodium 2-chloroethyl ethyl phosphite, etc. Condensation of the perchloromethyl mercaptan with the phosphite takes place by replacement of all four of the chlorine atoms of the perchloromethyl mercaptan by the phosphorus ester residue substantially according to the scheme:

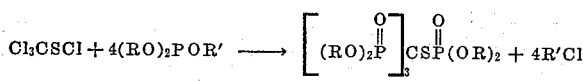

in which R and R' are as herein defined. When the phosphorus containing reactant is an alkali metal dialkyl or bis(haloalkyl) ester the reaction proceeds with the formation of an alkali metal chloride as by-product, the phosphorus containing residue entering at the portion of the formula occupied by the displaced chlorine atom. When the phosphorus reactant is a tri-ester the reaction is believed to occur by primary addition of the perchloromethyl mercaptan to the tri-ester with formation of an intermediate, unstable addition product of the quasi phosphonium type which decomposes, with the liberation of an alkyl or haloalkyl chloride to form the ester of the phosphorothiomethylidynetriphosphonic acid.

The reaction conditions employed for the preparation of the present condensates varies with the nature of the phosphite reactant. Generally, however, the condensation reaction occurs by simply contacting the phosphite with the perchloromethyl mercaptan at temperatures of, say, from 0° C. to 100° C. and allowing the resulting reaction mixture to stand until the desired condensate has been formed. Preferably the reaction is first initiated at the lower temperatures whereby generally an exothemic reaction takes place and subsequent heating is applied in order to complete the condensation. Generally, heating of from 40° C. to the refluxing temperature of the reaction mixture is thus employed. Because the present condensation reaction involves introduction of four of the phosphite residues into the perchloromethyl mercaptan molecule, the reactants are preferably employed in stoichiometric proportions, i. e., there is used four moles of the phosphite per mole of the perchloromethyl mercaptan. However, these proportions may be widely varied since any unreacted initial reactant is readily recovered from the resulting reaction product. Completion of the reaction is generally ascertained by noting cessation in the formation of by-product alkali metal chloride or alkyl or haloalkyl chloride.

The present condensates are stable, limpid to highly viscous materials which may be used for a wide variety of industrial and agricultural purposes, for example, as plasticizers for synthetic resins and plastics, as lubricant oil additives, and as biological toxicants. They are most advantageously employed as insecticides, being particularly toxic to mites and leaf-feeding insects when applied as a spray. While some of the present compounds possess a systemic effect when applied to plants, others have little if any systemic action. Generally, the present condensates are not phytotoxic.

In preparing the phosphorothiomethylidynetriphosphonates, I prefer to operate substantially as follows:

The perchloromethyl mercaptan is contacted gradually with the phosphorus ester reactant at ordinary or decreased temperatures and change of viscosity or color of the reaction mixture is noted. The reaction mixture may be heated if formation of a concentrate having the desired degree of substitution has not been attained at the low temperatures. In many instances heating is unnecessary; the reactants are merely allowed to stand or stirred at room temperature for a period of say, from several hours to several days depending upon the degree of substitution desired. However, it is generally desirable to accelerate the reaction by refluxing the reactants. Also, when employing the alkali metal salts as the phosphorus-containing reactant, it is often advantageous to work in the presence of the diluent originally employed in preparation of the alkali metal reactant. For example, when preparing the condensate, of say sodium diethyl phosphite and perchloromethyl mercaptan, the alkali metal salt may be prepared by treating diethyl phosphite in a diluent such as benzene, hexane or ether and the mixture of sodium diethyl phosphite and diluent thus obtained may be used directly in the condensation reaction by simply mixing it with the perchloromethyl mercaptan. A diluent may also be useful as a means of moderating the initially vigorous reaction. When employing a diluent, e. g., benzene, hexane or toluene, it is generally advisable to bring the temperature of the reaction mixture to the refluxing point after the initially rapid reaction has subsided.

The condensation reaction may also be effected at increased or diminished pressure depending upon the type of condensate desired; however, the ease of reaction at ordinary atmospheric pressure generally requires no control of the reaction by pressure variation.

The present invention is further illustrated, but not limited by the following examples:

*Example 1*

Freshly fractionated triethyl phosphite (108 g., 0.65 mole) was placed in a flask which was cooled in an ice bath, and 27.9 g. (0.15 mole) of perchloromethyl mercaptan was added to the phosphite during a period of 45 minutes at a temperature of 5–11° C. An exothermic reaction was noted. When the yellow reaction mixture was warmed to 100° C. there was no further indication of an exothermic reaction. Distillation of the whole under water pump pressure to remove material boiling below 5° C. (probably ethyl chloride) and concentration of the residue at 96° C./0.5 mm. gave 88.9 g. (100% theoretical yield) of the substantially pure hexaethyl (diethyl phosphorothiomethylidyne) triphosphonate product of the formula

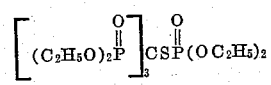

It analyzed as follows:

|  | Found | Calcd. for $C_{17}H_{40}O_{12}P_4S$ |
|---|---|---|
| Percent C | 35.52 | 34.5 |
| Percent H | 7.13 | 6.82 |
| Percent P | 19.27 | 20.9 |
| Percent S | 5.06 | 5.4 |

*Example 2*

This example describes the condensation of sodium diethyl phosphite with perchloromethyl mercaptan wherein all of the chlorine atoms of the mercaptan are replaced by the diethyl phosphite residue.

Sodium diethyl phosphite was prepared by adding 152 g. (1.1 moles) of diethyl phosphite to a suspension of 25.3 g. (1.1 moles) of sodium in about 400 ml. of dried benzene at refluxing temperatures. Refluxing was continued for an hour after addition of the phosphite had been completed. At the end of that time about 1 g. of unreacted sodium was removed from the reaction mixture and the mixture was then allowed to cool in an ice bath. To the cooled benzene solution of sodium diethyl phosphite there was then added 46.5 g. (0.25 mole) of perchloromethyl mercaptan during 1.75 hours. After allowing the whole to stand overnight at room temperature, it was refluxed for 1.5 hours, subsequently cooled to 0° C. and washed twice with 150 g. portions of ice-water. The organic layer was separated, dried and distilled to a pot temperature of 98° C./0.7 mm. to yield as residue 71.9 g. of the green, viscous hexaethyl (diethylphosphorothiomethylidyne) triphosphonate, $n_D^{25}$ 1.4528, which analyzed as follows:

|  | Found | Calcd. for $C_{17}H_{40}O_{12}P_4S$ |
|---|---|---|
| Percent P | 20.19 | 20.9 |
| Percent S | 6.43 | 5.4 |
| Percent Cl | 0.92 | 0.0 |

*Example 3*

Trimethyl phosphite (54.5 g., 0.44 mole) was placed in a flask and stirred and cooled in ice as 18.6 g. (0.10 mole) of perchloromethyl mercaptan was added during 18 minutes at a temperature of 4°–10° C. A vigorous exothermic reaction occurred. Upon removal of the ice bath there was no indication of further reaction until the reaction mixture was heated to above 65° C. Methyl chloride collected in a trap which formed a part of the reaction equipment. Heating was continued until the temperature of the reaction mixture was 101° C. Distillation of the reaction mixture to remove methyl chloride gave as residue 52.4 g. of the substantially pure hexamethyl (dimethyl phosphorothiomethylidyne) triphosphonate, $n_D^{25}$ 1.4728, of the formula

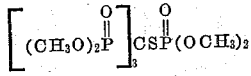

It analyzed as follows:

|  | Found | Calcd. for $C_9H_{24}O_{12}P_4S$ |
|---|---|---|
| Percent C | 23.09 | 22.5 |
| Percent H | 5.22 | 5.04 |
| Percent S | 6.01 | 6.7 |

*Example 4*

Into a 500 ml., 4-neck flask equipped with stirrer, thermometer, protected condenser, and dropping funnel there was added 136 g. (1.1 moles) of trimethyl phosphite. To the cooled phosphite during a period of 24 minutes there was then added 46.5 g. (0.25 mole) of perchloromethyl mercaptan at a temperature of 5–15° C. A vigorous exothermic reaction occurred first upon completing the addition of the mercaptan and again when the mixture was heated to above 65° C. Concentration of the reaction mixture to a pot temperature of 95° C./0.2 mm. gave as residue 116.6 g. (97% theoretical yield) of the substantially pure hexamethyl (dimethyl phosphorothiomethylidyne) triphosphonate.

*Example 5*

Tris (β-chloroethyl) phosphite (282 g., 1.05 moles) was cooled in an ice bath and 46.5 g. (0.25 mole) of perchloromethyl mercaptan was added to it during 45 minutes at a temperature of 10° to 25° C. After the initial very exothermic reaction had subsided the whole was warmed to 149° C. at water pump pressure. This removed 90.9 g. of ethylene dichloride from the reaction mixture. The residue was transferred to a distilling flask and concentrated to 151° C./0.1 mm. to give 230.5 g. of the substantially pure hexakis(β-chloroethyl) [bis(β-chloroethyl) phosphorothiomethylidyne] triphosphonate, $n_D^{25}$ 1.5056 which analyzed as follows:

|  | Found | Calcd. for $C_{17}H_{32}Cl_8O_{12}P_4S$ |
|---|---|---|
| Percent Cl | 32.18 | 32.7 |
| Percent P | 13.62 | 14.3 |
| Percent S | 3.05 | 3.69 |

The above analysis corresponds well with the following structure:

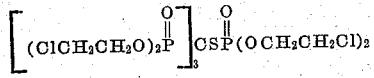

*Example 6*

This example shows the insecticidal activity of the sodium diethyl phosphite-perchloromethyl mercaptan condensate of Example 2. The following testing procedures were used:

(1) *Contact drop application.*—To fifth instar milkweed bugs there was applied a measure drop of the condensate at 1.0 percent concentration in acetone on the dorsal part of the thorax. Application was by means of a micrometer device actuating the plunger of a hypodermic needle.

(2) *Residue test.*—Petri dishes were sprayed with acetone solutions of the condensate at the concentrations show below. The sprayed dishes were allowed to dry. Tribolium beetles or third instar milkweed bugs were placed on the sprayed and dried surfaces, and confined there for 48 hours. Spraying of the dishes was conducted by means of a precision sprayer in a modified horizontal Hoskins spray chamber.

(3) *Spraying of infested plants.*—Bean plants infested with the 2-spotted mite were sprayed with an atomizer on both leaf surfaces at indicated concentrations of the condensate in a cyclohexanone-water emulsion. The plants were then held for 7 days for observation of kill of mites and their eggs.

(4) *Contact of residue on plants.*—Bean plants were sprayed with a cyclohexane-water emulsion of the condensate at the indicated concentration, the spray on the plants was allowed to become thoroughly dry, and cabbage aphids were transferred to plants supporting the dried residue. At the end of 7 days, observation was made of kill of said aphids.

(5) *Systemic insecticidal effect.*—Plants cut at the ground level were placed in flasks with the cut stem end in a water solution or suspension of the test chemical at the indicated concentration. After 24 hours, Mexican bean bettles were placed on the foliage leaf and held there for 10 days, and at the end of this time observation of kill of the beetles was made.

Employing the above tests the following observations were made:

| Percent Concentration of Condensate | Percent Kill In Test No. | | | | | |
|---|---|---|---|---|---|---|
| | 1 | 2 | | 3 | | 4 | 5 |
| | | Beetles | Milkweed bugs | Adults | Eggs | | |
| 1.0 | 100 | 100 | 100 | | | | |
| 0.2 | | | | 100 | 100 | 100 | |
| 0.1 | | 100 | 100 | 100 | 100 | | |
| 0.01 | | | | | | | 100 |

Other esters of phosphorothiomethylidynetriphosphonic acid which are very valuable as insecticides include hexamethyl (dimethyl phosphorothiomethylidyne)triphosphonate (from perchloromethyl mercaptan and trimethyl phosphite or sodium dimethyl phosphite); hexakis(2-chloroethyl) [bis(2 - chloroethyl)phosphorothiomethylidyne]triphosphonate (rom tris(2-chloroethyl) phosphite or potassium bis(2-chloroethyl)phosphite and perchloromethyl mercaptan; tri-n-butyl triethyl (butyl ethyl phosphorothiomethylidyne)triphosphonate (from sodium butyl ethyl phosphite and perchloromethyl mercaptan); hexapropyl (dipropyl phosphorothiomethylidyne)triphosphonate (from tripropyl phosphite and perchloromethyl mercaptan), etc.

The present compounds are generally applied for insecticidal use in the form of sprays or aerosols. The spray may be prepared by dissolving the condensates in the usual organic solvents, e. g., acetone, hexane, benzene or carbon tetrachloride or by incorporating them into aqueous emulsions. The condensates may also be dissolved in liquefied gases such as the fluorochloroethanes or methyl chloride and applied from aerosol bombs made from the solutions.

Instead of employing liquids as carriers and diluents, insecticidal dusts comprising the present condensates may be prepared. For example they may be incorporated with a solid carrier such as talc, clay, lime, bentonite, pumice, fuller's earth, etc. and employed generally as pesticidal dusts.

This application is a continuation-in-part of my copending application Serial No. 388,410, filed October 26, 1953.

What I claim is:

1. An ester of phosphorothiomethylidynetriphosphonic acid having the formula

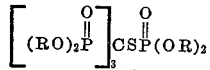

in which R is a haloalkyl radical of from 1 to 6 carbon atoms.

2. Hexakis($\beta$-chloroethyl) [bis($\beta$-chloroethyl) phosphorothiomethylidyne]triphosphonate.

3. The method which comprises contacting one mole of perchloromethyl mercaptan with three moles of a phosphite having the formula $(RO)_2POR'$ in which R is a haloalkyl radical of from 1 to 6 carbon atoms and R' is selected from the class consisting of R and alkali metal and recovering from the resulting reaction product an ester of phosphorothiomethylidynetriphosphonic acid having the formula

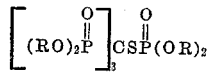

in which R is a haloalkyl radical of from 1 to 6 carbon atoms.

4. The method which comprises contacting one mole of perchloromethyl mercaptan with three moles of tris($\beta$-chloroethyl) phosphite and recovering from the resulting reaction product hexakis($\beta$-chloroethyl) [bis($\beta$-chloroethyl) phosphorothiomethylidyne]triphosphonate.

References Cited in the file of this patent
UNITED STATES PATENTS 2,335,953    McCracken et al.    Dec. 7, 1943
2,760,937    McDermott    Aug. 28, 1956